(12) United States Patent
Davis

(10) Patent No.: US 11,215,077 B1
(45) Date of Patent: Jan. 4, 2022

(54) INTEGRAL GEAR SUPPORT AND BEARING DAMPER PEDESTAL

(71) Applicant: Raytheon Technologies Corporation, Farmington, CT (US)

(72) Inventor: Todd A. Davis, Tolland, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 16/994,827

(22) Filed: Aug. 17, 2020

(51) Int. Cl.
F01D 25/16 (2006.01)

(52) U.S. Cl.
CPC ........ F01D 25/162 (2013.01); *F05D 2240/60* (2013.01); *F05D 2260/4031* (2013.01); *F05D 2260/96* (2013.01)

(58) Field of Classification Search
CPC ............... F01D 25/162; F01D 2240/60; F01D 2260/4031; F01D 2260/96
See application file for complete search history.

(56) References Cited

U.S. PATENT DOCUMENTS

| | | | | |
|---|---|---|---|---|
| 2,932,443 | A * | 4/1960 | Gunberg | F01D 25/16 74/417 |
| 4,598,600 | A * | 7/1986 | Knowles | F01D 25/162 60/798 |
| 7,552,591 | B2 * | 6/2009 | Bart | F02C 7/32 60/792 |
| 8,015,828 | B2 * | 9/2011 | Moniz | F02C 7/275 60/786 |
| 8,152,438 | B2 * | 4/2012 | Servant | F16D 1/06 415/1 |
| 9,003,638 | B2 | 4/2015 | Menheere et al. | |
| 9,863,325 | B2 * | 1/2018 | Lemarchand | F01D 25/162 |
| 9,945,259 | B2 | 4/2018 | Cigal et al. | |
| 10,487,747 | B2 * | 11/2019 | Curlier | F02C 7/32 |
| 2020/0003261 | A1 * | 1/2020 | Boehme | F16C 19/522 |
| 2021/0140368 | A1 * | 5/2021 | Anglin | F02C 7/06 |

* cited by examiner

*Primary Examiner* — Jesse S Bogue
(74) *Attorney, Agent, or Firm* — Cantor Colburn LLP

(57) ABSTRACT

A bearing compartment of a gas turbine engine includes a case element, a towershaft bearing located in the case element and supportive of a towershaft, and a shaft bearing located in the case element and supportive of an engine shaft. An integral gear support and bearing damper pedestal, includes a support base secured to the case element, and a gear support arm extending from the support base to the towershaft bearing. The gear support arm is supportive of the towershaft bearing. A bearing damper pedestal extends from the support base to the shaft bearing and is located radially outboard of a bearing outer race of the shaft bearing.

18 Claims, 4 Drawing Sheets

INTEGRAL GEAR SUPPORT AND BEARING DAMPER PEDESTAL

BACKGROUND

Exemplary embodiments of the present disclosure pertain to the art of gas turbine engines, and more particularly to bearing supports of gas turbine engines.

Centering spring bearing supports have been used on legacy engines to provide the appropriate stiffness at the bearing location to balance the engine's overall rotor dynamics and load signature. The type of center spring design has evolved, but it typically contains some elements of beams or rods that allow radial displacement that is limited and damped by an oil film.

At one location, a bearing damper pedestal and oil and air feed passages are formed into an intermediate case of the gas turbine engine, which complicates the intermediate case casting. Also, in such configurations the intermediate case requires plating or hardcoat application at the location of bearing damper piston rings. Also there are overall manufacturing improvements that can be gained by moving the damper surface, and the damper pedestal, which requires tight tolerances, wear resistant coatings and direct oil/air feeds, to a smaller and less complicated part.

BRIEF DESCRIPTION

In one embodiment, a bearing compartment of a gas turbine engine includes a case element, a towershaft bearing located in the case element and supportive of a towershaft, and a shaft bearing located in the case element and supportive of an engine shaft. An integral gear support and bearing damper pedestal, includes a support base secured to the case element, and a gear support arm extending from the support base to the towershaft bearing. The gear support arm is supportive of the towershaft bearing. A bearing damper pedestal extends from the support base to the shaft bearing and is located radially outboard of a bearing outer race of the shaft bearing.

Additionally or alternatively, in this or other embodiments the assembly includes a bearing centering spring including a base portion secured to the case element, a bearing interface portion secured to the bearing outer race, and a plurality of beams extending between the base portion and the bearing interface portion.

Additionally or alternatively, in this or other embodiments the plurality of beams are located radially outboard of the bearing damper pedestal.

Additionally or alternatively, in this or other embodiments the bearing interface portion is located radially inboard of the bearing damper pedestal.

Additionally or alternatively, in this or other embodiments one or more supports extend from the intermediate case to the bearing damper pedestal.

Additionally or alternatively, in this or other embodiments the one or more supports extend between circumferentially adjacent beams of the plurality of beams.

Additionally or alternatively, in this or other embodiments the base portion and the support base are secured to a same case flange of the case element.

Additionally or alternatively, in this or other embodiments one or more openings are formed in the bearing centering spring and are configured for passage of fluid or air therethrough.

Additionally or alternatively, in this or other embodiments the one or more openings are formed in a spring flange of the bearing centering spring, extending between the plurality of beams and the bearing interface portion.

Additionally or alternatively, in this or other embodiments one or more ribs extend from the bearing damper pedestal configured to improve a rigidity of the bearing damper pedestal.

In another embodiment, a gas turbine engine includes a turbine, a shaft driven by the turbine, a towershaft coupled to an extending from the shaft, and a bearing compartment. The bearing compartment includes a case element, a towershaft bearing located in the case element and supportive of the towershaft, a shaft bearing located in the case element and supportive of the shaft, and an integral gear support and bearing damper pedestal. The integral gear support and bearing damper pedestal includes a support base secured to the case element, a gear support arm extending from the support base to the towershaft bearing, the gear support arm supportive of the towershaft bearing, and a bearing damper pedestal extending from the support base to the shaft bearing and located radially outboard of a bearing outer race of the shaft bearing.

Additionally or alternatively, in this or other embodiments the bearing compartment includes a bearing centering spring including a base portion secured to the case element, a bearing interface portion secured to the bearing outer race, and a plurality of beams extending between the base portion and the interface portion.

Additionally or alternatively, in this or other embodiments the plurality of beams are located radially outboard of the bearing damper pedestal.

Additionally or alternatively, in this or other embodiments the bearing interface portion is located radially inboard of the bearing damper pedestal.

Additionally or alternatively, in this or other embodiments one or more supports extend from the intermediate case to the bearing damper pedestal.

Additionally or alternatively, in this or other embodiments the one or more supports extend between circumferentially adjacent beams of the plurality of beams.

Additionally or alternatively, in this or other embodiments the base portion and the support base are secured to a same case flange of the case element.

Additionally or alternatively, in this or other embodiments one or more openings are formed in the bearing centering spring and are configured for passage of fluid or air therethrough.

Additionally or alternatively, in this or other embodiments the one or more openings are formed in a spring flange of the bearing centering spring, extending between the plurality of beams and the bearing interface portion.

Additionally or alternatively, in this or other embodiments one or more ribs extend from the bearing damper pedestal and are configured to improve a rigidity of the bearing damper pedestal.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
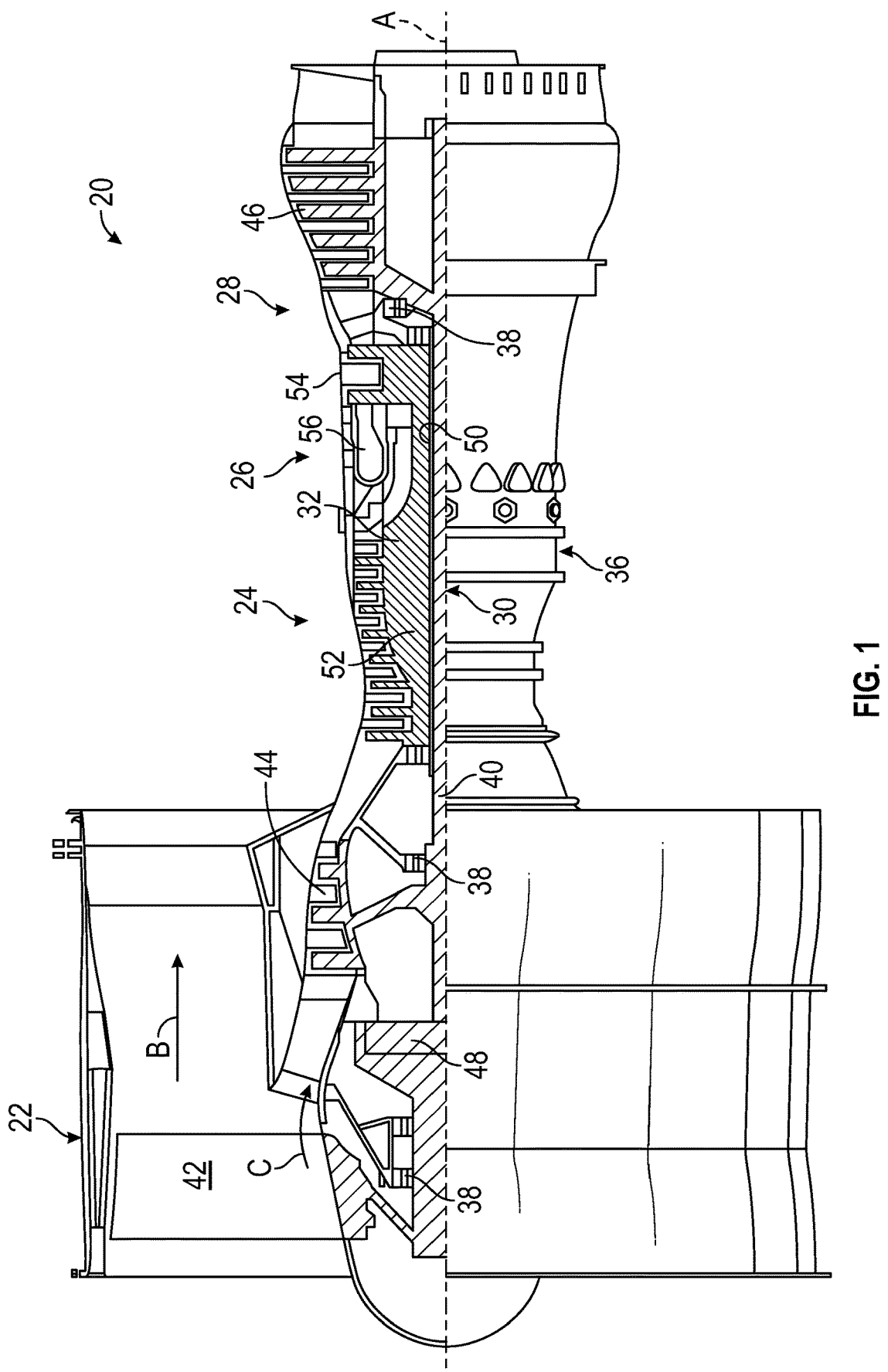
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram }° \text{ R})/(518.7° \text{ R})]^{0.5}$. The "Low corrected fan tip speed" as disclosed herein according to one non-limiting embodiment is less than about 1150 ft/second (350.5 m/sec).

Figure 2:
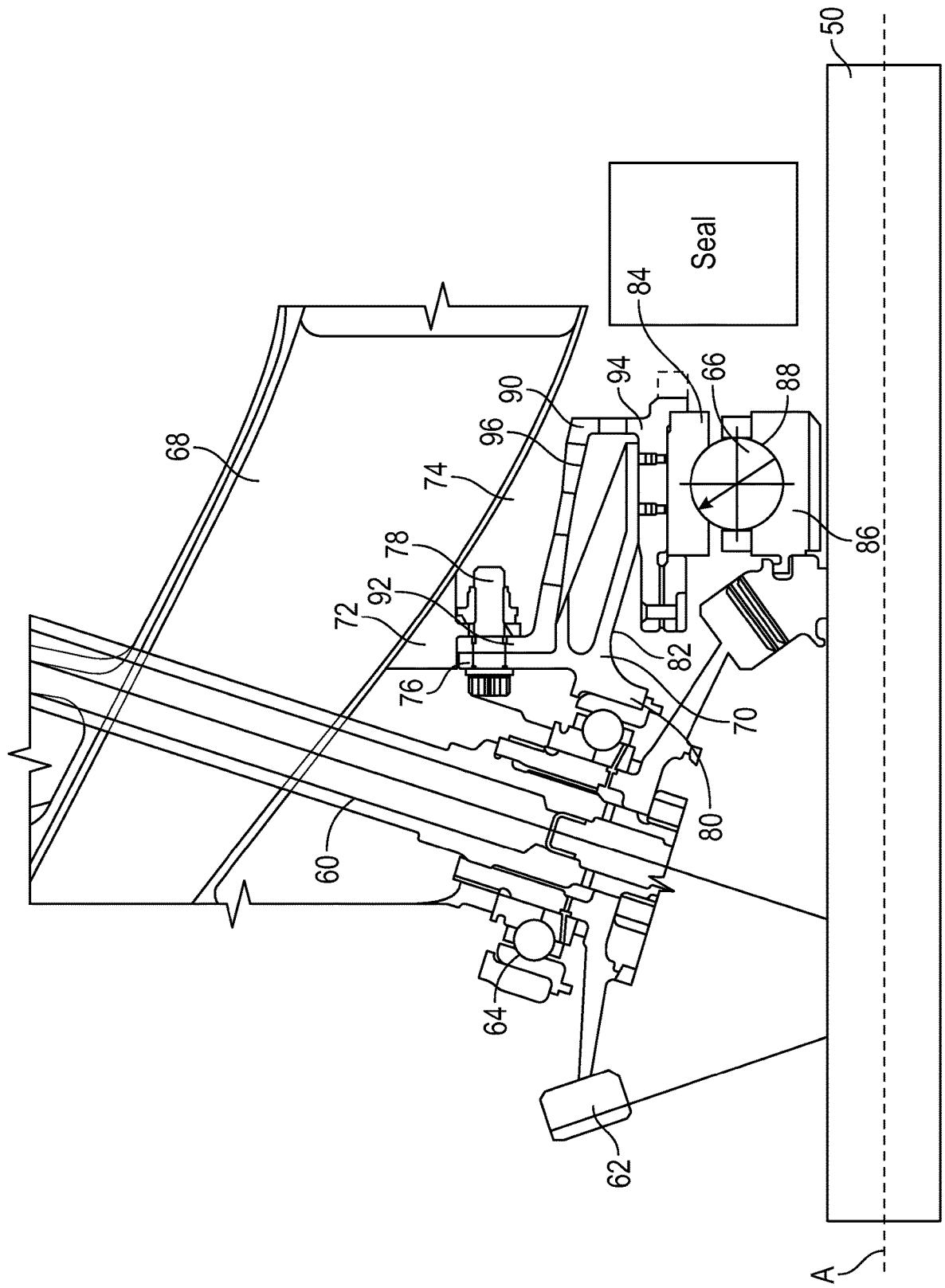
FIG. 2 is a cross-sectional view of an embodiment of a bearing compartment.

Referring now to FIG. 2, the gas turbine engine 20 includes a towershaft 60 coupled to one or more of the inner shaft 40 and the outer shaft 50 via a towershaft gear 62. While the disclosure herein can be applied at either of the inner shaft 40 or the outer shaft 50, the following exemplary description will reference the outer shaft 50. The towershaft 60 utilizes rotational energy of the outer shaft 50 to drive accessories of the gas turbine engine 20 and/or an aircraft to which the gas turbine engine 20 is installed. The towershaft 60 is supported by a towershaft bearing 64. A shaft bearing 66 supports the outer shaft 50. The towershaft 60 and the shaft bearing 66 are located in an intermediate case 68 of the gas turbine engine 20.

A gear support 70 is secured to the intermediate case 68 at, for example, a case flange 72 extending from an inner case surface 74 of the intermediate case 68. The gear support 70 includes a support base 76 located at the case flange 72. A plurality of bolts 78 are installed through the support base 76 and the case flange 72 to secure the gear support 70 to the case flange 72.

The gear support 70 includes a gear support arm 80 extending to a support of the towershaft bearing 64 and a bearing damper pedestal 82 extending toward the shaft bearing 66. The shaft bearing 66 includes a bearing outer race 84, a bearing inner race 86, and a plurality of bearing elements 88 located between the bearing outer race 84 and the bearing inner race 86. A bearing centering spring 90 is further secured to the case flange 72 via the plurality of bolts 78. The bearing outer race 84 is supported by the centering spring 90. The centering spring 90 extends circumferentially around the engine central longitudinal axis A.

The centering spring 90 is annular in shape and includes a base portion 92 secured at the case flange 72 via the plurality of bolts 78, and a bearing interface portion 94 located at and secured to the bearing outer race 84. A plurality of beams 96 extend from the base portion 92 to the bearing interface portion 94, the beams 96 circumferentially spaced from each other. The configuration of the beams 96 defines a spring rate or flexibility of the centering spring 90 to react loads on the bearing outer race 84. In some embodiments, a circumferential thickness and/or a radial thickness of the beams 96 varies along an axial beam length. In some embodiments, the circumferential thickness and/or the radial thickness are at their minimums at or near a midpoint of the axial beam length. The centering spring 90 wraps around the bearing damper pedestal 82 such that the bearing interface portion 94 is located radially inboard of the bearing damper pedestal 82 and the plurality of beams 96 are located radially outboard of the bearing damper pedestal 82.

Figure 3:
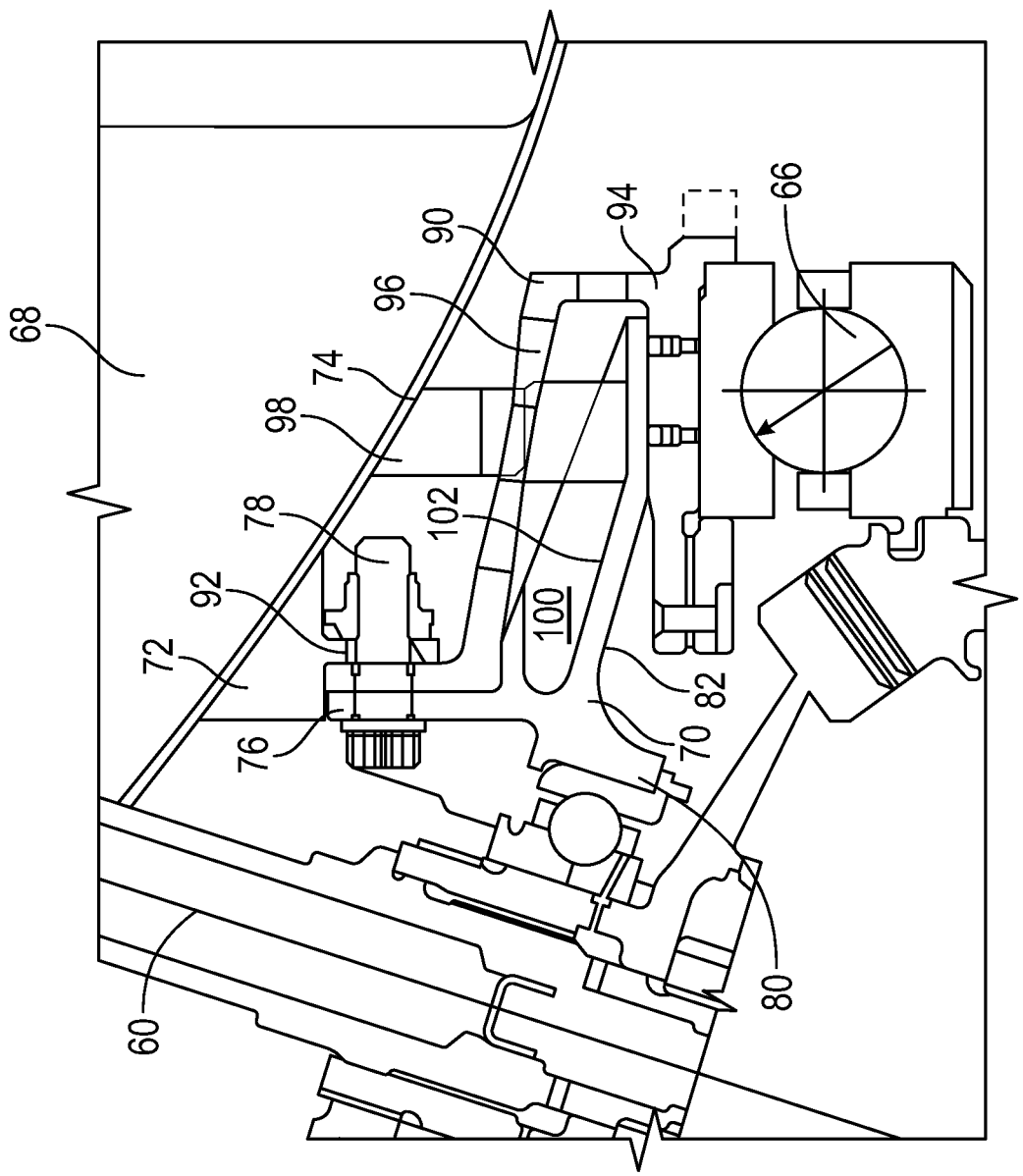
FIG. 3 is another cross-sectional view of an embodiment of a bearing compartment.

Referring to FIG. 3, in some embodiments, the intermediate case 68 may include one or more supports 98, which extend from the inner case surface 74 through the openings between circumferentially adjacent beams 96 and to the bearing damper pedestal 82. The one or more supports 98 aid in locating and radially supporting the bearing damper pedestal 82. In other embodiments, the bearing damper pedestal 82 may include one or more ribs 100 extending from a radially outboard surface 102 of the bearing damper pedestal 82 and extending along an axial length of the bearing damper pedestal 82. The one or more ribs 100 increase radial rigidity of the bearing damper pedestal 82 and are utilized as needed based upon bearing loads.

Figure 4:
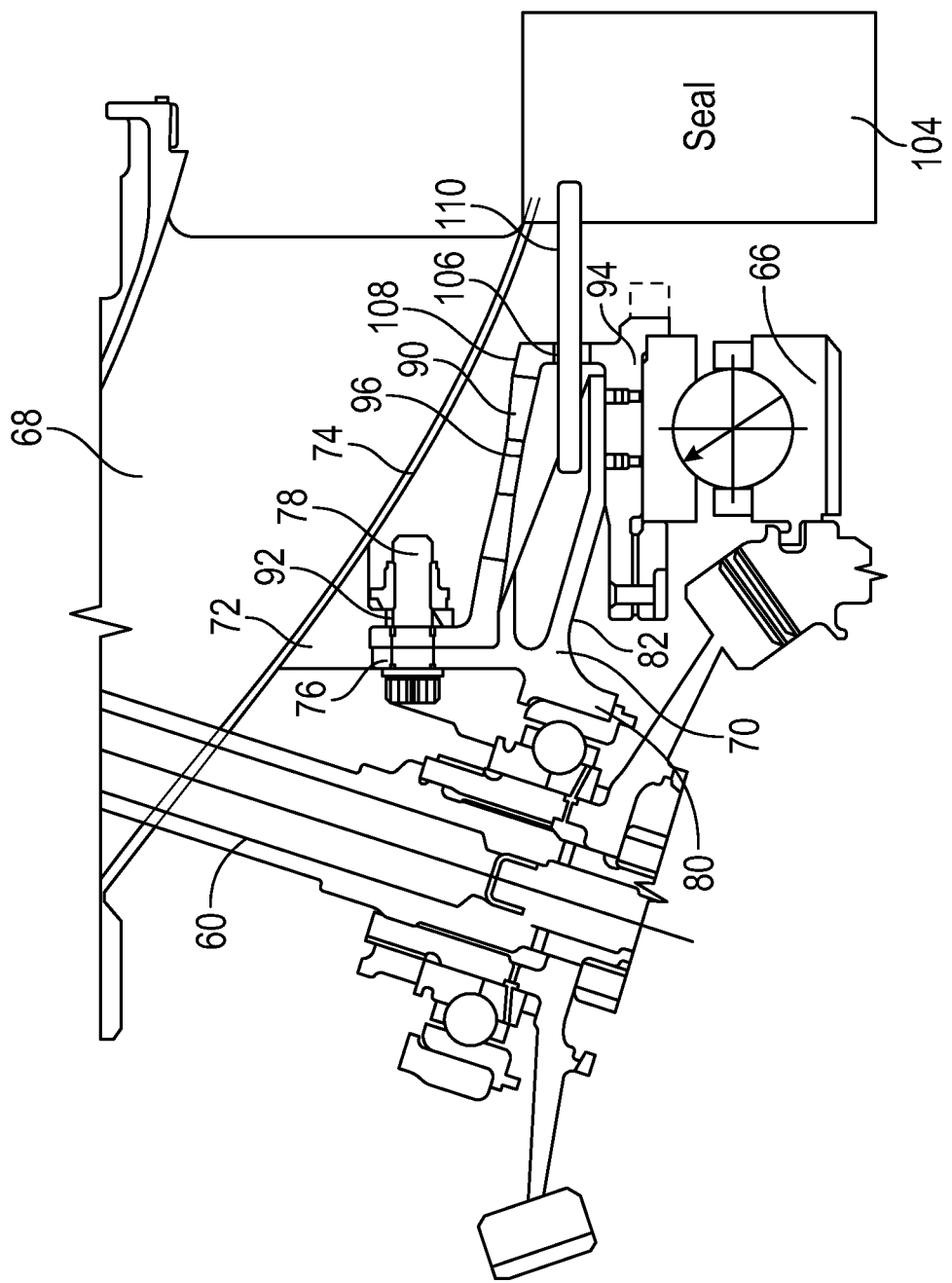
FIG. 4 is another cross-sectional view of an amendment of a bearing compartment.

Referring now to FIG. 4, the centering spring 90 includes one or more features to allow for oil and air services to seal 104 to be passed through the centering spring 90. The features may include one or more service openings 106 defined in a spring flange 108 located radially between the plurality of beams 96 and the bearing interface portion 94. The service openings 106 allow, for example, jumper tubes 110 to pass to the seal 104 via the centering spring 90. Incorporation of the service openings 106 into the centering spring 90 instead of forming cored passages in the intermediate case 68 reduces the cost and complexity of the intermediate case 68 casting.

Utilizing the gear support 70 and centering spring 90 configurations described herein reduces cost and complexity of the intermediate case 68, as the number of tight tolerance cast and machined surfaces are removed from the intermediate case 68. Such surfaces are moved to a smaller and less expensive part, improving manufacturability and repairability. Further, orienting the beams 96 radially outboard of the shaft bearing 66 allows for better tuning of the beams 96 for load and stiffness without affecting overall bearing compartment or engine length.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A bearing compartment of a gas turbine engine, comprising:
    a case element;
    a towershaft bearing located in the case element and supportive of a towershaft;
    a shaft bearing located in the case element and supportive of an engine shaft; and
    an integral gear support and bearing damper pedestal, including:
        a support base secured to the case element;
        a gear support arm extending from the support base to the towershaft bearing, the gear support arm supportive of the towershaft bearing; and
        a bearing damper pedestal extending from the support base to the shaft bearing and located radially outboard of a bearing outer race of the shaft bearing;
        further comprising a bearing centering spring including: a base portion secured to the case element; a bearing interface portion secured to the bearing outer race; and a plurality of beams extending between the base portion and the bearing interface portion.

2. The bearing compartment of claim 1, wherein the plurality of beams are located radially outboard of the bearing damper pedestal.

3. The bearing compartment of claim 2, wherein the bearing interface portion is located radially inboard of the bearing damper pedestal.

4. The bearing compartment of claim 1, further comprising one or more supports extending from the intermediate case to the bearing damper pedestal.

5. The bearing compartment of claim 4, wherein the one or more supports extend between circumferentially adjacent beams of the plurality of beams.

6. The bearing compartment of claim 1 wherein the base portion and the support base are secured to a same case flange of the case element.

7. The bearing compartment of claim 1, further comprising one or more openings formed in the bearing centering spring configured for passage of fluid or air therethrough.

8. The bearing compartment of claim 7, wherein the one or more openings are formed in a spring flange of the bearing centering spring, extending between the plurality of beams and the bearing interface portion.

9. The bearing compartment of claim 1, further comprising one or more ribs extending from the bearing damper pedestal configured to improve a rigidity of the bearing damper pedestal.

10. A gas turbine engine, comprising:
a turbine;
a shaft driven by the turbine;
a towershaft coupled to an extending from the shaft; and
a bearing compartment, including:
 a case element;
 a towershaft bearing located in the case element and supportive of the towershaft;
 a shaft bearing located in the case element and supportive of the shaft; and
 an integral gear support and bearing damper pedestal, including:
  a support base secured to the case element;
  a gear support arm extending from the support base to the towershaft bearing, the gear support arm supportive of the towershaft bearing; and
  a bearing damper pedestal extending from the support base to the shaft bearing and located radially outboard of a bearing outer race of the shaft bearing further comprising a bearing centering spring including: a base portion secured to the case element; a bearing interface portion secured to the bearing outer race; and a plurality of beams extending between the base portion and the interface portion.

11. The gas turbine engine of claim 10, wherein the plurality of beams are located radially outboard of the bearing damper pedestal.

12. The gas turbine engine of claim 11, wherein the bearing interface portion is located radially inboard of the bearing damper pedestal.

13. The gas turbine engine of claim 10, further comprising one or more supports extending from the intermediate case to the bearing damper pedestal.

14. The gas turbine engine of claim 13, wherein the one or more supports extend between circumferentially adjacent beams of the plurality of beams.

15. The gas turbine engine of claim 10, wherein the base portion and the support base are secured to a same case flange of the case element.

16. The gas turbine engine of claim 10, further comprising one or more openings formed in the bearing centering spring configured for passage of fluid or air therethrough.

17. The gas turbine engine of claim 16, wherein the one or more openings are formed in a spring flange of the bearing centering spring, extending between the plurality of beams and the bearing interface portion.

18. The gas turbine engine of claim 10, further comprising one or more ribs extending from the bearing damper pedestal configured to improve a rigidity of the bearing damper pedestal.

* * * * *